United States Patent [19]

Hoffman

[11] Patent Number: 5,753,074
[45] Date of Patent: May 19, 1998

[54] METHOD OF WASHING A THIN MAT OF CELLULOSIC PULP

[75] Inventor: Roger P. Hoffman, Green Bay, Wis.

[73] Assignee: Hoffman Environmental Systems, Inc., Green Bay, Wis.

[21] Appl. No.: 697,271

[22] Filed: Aug. 21, 1996

Related U.S. Application Data

[63] Continuation of Ser. No. 298,749, Aug. 31, 1994, abandoned.

[51] Int. Cl.$^6$ ........................................ D21C 9/02
[52] U.S. Cl. .................. 162/4; 162/60; 162/204; 162/205; 68/44; 68/205 R
[58] Field of Search .................. 162/60, 4, 204, 162/205, 203, 300, 301; 68/181 R, 205 R, 62, 44, 45

[56] References Cited

U.S. PATENT DOCUMENTS

| | | | |
|---|---|---|---|
| 3,906,853 | 9/1975 | Wohlfarter | 162/301 |
| 4,113,556 | 9/1978 | Kankaanpaa | 162/301 |
| 4,501,040 | 2/1985 | Biondetti et al. | 162/60 |
| 4,664,749 | 5/1987 | Haapamaki et al. | 162/56 |
| 4,680,088 | 7/1987 | Bastanzuri | 162/4 |
| 5,013,460 | 5/1991 | Meredith | 210/770 |
| 5,045,181 | 9/1991 | North | 209/10 |
| 5,114,536 | 5/1992 | Kangas | 162/58 |
| 5,122,229 | 6/1992 | Seifert | 162/60 |

FOREIGN PATENT DOCUMENTS

| 197 608 | 2/1975 | Japan | 162/50 |
|---|---|---|---|

Primary Examiner—Steven Alvo
Attorney, Agent, or Firm—Andrus, Sceales, Starke & Sawall

[57] ABSTRACT

A method of washing cellulosic pulp to remove dissolved solids as well as dirt, inorganic fillers and fiber debris. A mat of cellulosic pulp having a weight of 3 to 100 lbs. of dry fiber per 1000 sq.ft. is positioned between a pair of porous endless belts to provide a composite structure. The composite structure is moved in a generally vertical path of travel through a vessel containing a plurality of superimposed rolls and the composite structure is passed over the rolls in a manner in which a first of the belts is in direct contact with one roll and the second of the belts is in direct contact with the next adjacent roll. A stream of water is directed against the composite structure as it travels in the upper portion of the vessel, and the water is cascaded downwardly through the vessel and directed into contact with opposite sides of the structure to thereby remove dissolved solids, as well as inorganic fillers. The tension of the belts as they pass over the rolls creates a dewatering action. After passing through the vessel, the washed pulp mat is removed from the belts, and the washing water is discharged through an outlet in the vessel and can be used in other portions of the papermaking process.

5 Claims, 1 Drawing Sheet

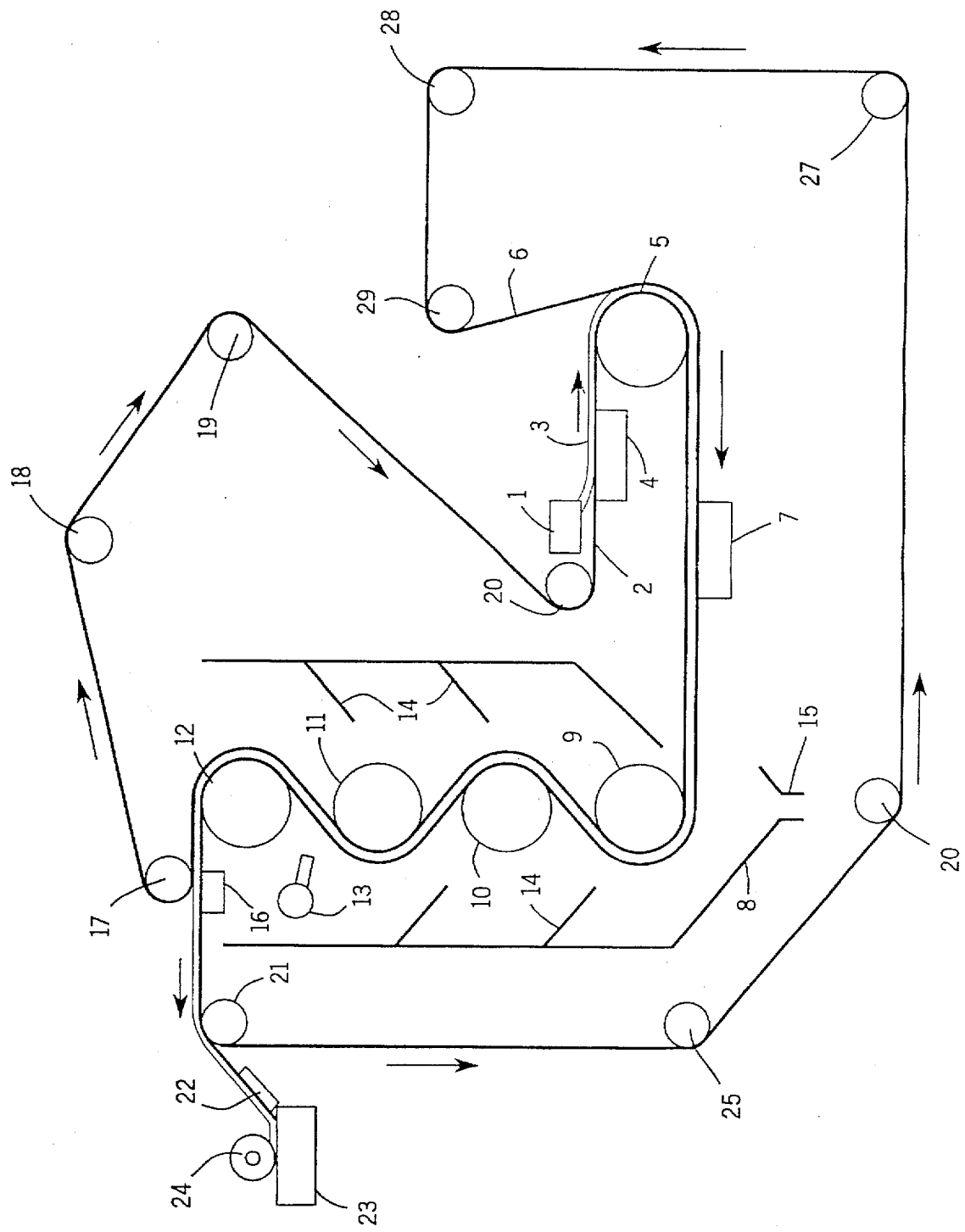

METHOD OF WASHING A THIN MAT OF CELLULOSIC PULP

This is a continuation of application Ser. No. 08/298,749, filed Aug. 31, 1994, now abandoned.

BACKGROUND OF THE INVENTION

A challenge in developing a papermaking mill using recycled fibers, such as used corrugated containers wastepaper, and the like, is minimizing the environmental impact resulting from water and solid waste disposal.

In a typical virgin pulp papermaking process, the pulp, after pulping, is subjected to a series of cleaning operations to remove debris and larger particulate material, and the pulp is then subjected to a washing process to remove the dissolved solids generated by the chemicals used in the pulping process. In the past, virgin pulp has been washed using either a drum washing process or a belt washing process. In a drum washing process a mat or layer of pulp is applied to the outer surface of a porous drum and is showered with water. A vacuum drawn on the inside of the drum draws the wash water through the mat. Generally three to five stages of washing are utilized with a conventional drum washing operation.

In a belt washing process, a mat of virgin pulp is fed onto an endless porous belt or fabric, and wash water is sprayed onto the mat. The mat is dewatered by vacuum boxes located beneath the fabric. In a typical operation, five stages of washing may be employed in order to remove the dissolved solids from the virgin pulp. After washing, virgin pulp still maintains a significant quantity of dissolved solids, and because of the nature of washing utilizing very thick pulp mats, dirt, and fiber debris are also present in conventionally washed virgin pulp.

Recycled pulp, composed of used corrugated containers, wastepaper, white office waste, and the like, cannot successfully be washed in the same manner as virgin pulp, because of the presence of inorganic fillers, such as clay and calcium carbonate, in the recycled pulp. In the conventional drum and belt washing, as described above, the pulp mats are very thick and it is difficult to remove small particles of the fillers, through a thick mat since the pulp acts like a filter and entraps the filler particles. Consequently pulp washing of recycled fiber has been done with a side hill screen, or with a unit known as a "Variosplit". With the use of a side hill screen, the pulp is diluted with a tremendous quantity of water and is flowed over the screen. While the side hill screen will act to remove dissolved solids as well as the fillers, unfortunately a substantial quantity of small fibers are carried through in the liquid stream, and to remove the inorganic fillers and small fibers from the liquid stream, a large floatation clarifier is normally utilized. In the clarifier, air and a coagulative polymer are added to the liquid, resulting in a sludge that floats to the top of the vessel and typically contains from 60% to 80% of potentially usable fibers, with the remainder being short fiber and filler. This sludge is further dewatered and traditionally has been landfilled. Thus, the present processes for washing recycled pulp not only utilize a tremendous quantity of water, but result in a substantial loss of good fibrous material. Additionally, washing of recycled pulp is very inefficient in removing dissolved solids since significant quantities of wash water are incorporated.

SUMMARY OF THE INVENTION

The invention is directed to a process for washing pulp and has particular application to washing recycled and Virgin pulp which contains dirt, inorganic fillers, and fiber debris. The process removes dissolved solids, as well as inorganic fillers, with a minimum quantity of wash water, and the wash water being discharged from the process can be re-used in the pulping operation.

In accordance with the invention, a thin mat of pulp having a weight of 3 to 100 lbs. of dry fiber per 1000 sq. ft. is applied to a porous endless fabric or belt, and preferably is sandwiched between a pair of porous endless fabrics or belts, to provide a composite structure. The composite structure is then passed over dewatering devices, such as foils, to partially remove water from the mat, and the composite structure then travels upwardly in a generally vertical path of travel through a vessel or tank which contains a series of vertically superimposed rollers or drums. The composite structure is passed over the rolls in a manner such that a first of the porous belts is in direct contact with one roll, and the second belt is in direct contact with an adjacent roll.

As the composite structure travels upwardly through the vessel, wash water is directed again the structure and the water is cascaded downwardly through the vessel by a series of baffles that are attached to the inner wall of the vessel. The baffles are arranged so that the wash water will contact both faces of the composite structure, as it is moving through the vessel to thereby remove dissolved solids, as well as fillers, such as clay and calcium carbonate.

The tension in the belts as they travel around the rolls, creates a dewatering action, so that the pulp mat is alternately showered with water and then dewatered by the belt tension. Thus, water is fed into opposite sides of the mat and is similarly drained from both sides of the mat, as the composite structure passes in its sinusoidal path over the rollers or drums.

The wash water is discharged through an outlet in the lower end of the vessel and can be reused in the papermaking process, as for example, in the pulping operation.

The composite structure after washing exits from the upper end of the vessel and the pulp mat is then removed from between the belts and subjected to further treatment and fed to a pulp chest.

The washing process of the invention removes fillers and dissolved solids, while utilizing a minimum quantity of water, as compared with conventional recycled pulp washing operations.

As the water being discharged from the washing vessel can be recycled and used in the pulping operation, this results in an overall decrease in water consumption in the papermaking process.

Other objects and advantages will appear in the course of the following description.

BRIEF DESCRIPTION OF THE DRAWINGS

The drawings illustrate the best mode presently contemplated of carrying out the invention.

The sole FIGURE is a schematic representation of the apparatus used to carry out the method of the invention.

DESCRIPTION OF THE ILLUSTRATED EMBODIMENT

The invention is directed to a process for washing pulp and has particular use in washing recycled pulp composed of material such as used corrugated cartons, wastepaper, and the like, which contain dirt and inorganic fillers, such as clay and calcium carbonate, in addition to dissolved solids like alum and sodium salts. As shown in the drawing, a pulp, prepared by conventional pulping techniques and having a solids content of about 0.3% to 2.0% by weight, and preferably about 0.4% to 1.0% by weight, is fed from a head box 1 onto a porous belt or screen 2 in the form of a very thin mat 3 having a basis weight in the range of 3 to 100 pounds of dry fiber per 1,000 sq. ft. and preferably 5 to 30 pounds of dry fiber per 1,000 sq. ft. Belt 2 preferably has a mesh size of about 25 to 70.

Belt 2 carrying mat 3 then passes over a foil box 4, where a portion of the water is removed from the mat and then passes around roll 5. A second porous belt 6 or screen having a mesh size similar to belt 2 also passes around roll 6 on the outer surface of mat 3, thus sandwiching mat 3 between the belts 2 and 6 and providing a composite structure.

After leaving the roll 5, the composite structure passes across a second foil box 7 to remove additional water from the mat, and the composite structure then enters the lower end of a vessel or tank 8. Journaled for rotation within vessel 8 is a series of vertically superimposed rolls 9, 10, 11 and 12. Rolls 11 and 12 can be drive rolls, while rolls 9 and 10 are idler rolls. As belt 2 is in direct contact with roll 11, and belt 6 is in direct contact with roll 12, both belts will be connected to the drive mechanism for synchronization. The drive for rolls 11 and 12 can be any conventional electric or hydraulic drive system, which will drive the composite structure at a speed in excess of 1000 ft. per minute and generally at a speed in the range of 300 to 4,000 ft. per minute.

As the composite structure passes upwardly through vessel 8, wash water is directed against the structure through a suitable shower or jet 13. As shown in the drawing, the shower 13 is located between rolls 11 and 12, so that the wash water will be directed at the portion of the composite structure passing between rolls 11 and 12.

The wash water is cascaded downwardly through vessel 8 by a series of baffles 14 which are mounted on the inner surface of vessel 8 on either side of the row of rolls 9-12. The baffles 14 serve to direct the cascading water against opposite faces of the pulp mat 3 which is sandwiched between belts 2 and 6, to thereby impregnate the mat with water. As the composite structure then passes over the rolls 9-12, the tension in belts 2 and 6 creates a dewatering action to extract or discharge the impregnated water.

In practice, mat 3 may have a solids contents of 0.3% to 2.0% by weight, and preferably about 1.0%, as it is applied to belt 2 from headbox 1, and will be dewatered by foils 4 and 7, so that it has a solids content of 2.0% to 6.0% and preferably about 4.0% as it enters the washing vessel 8. As wash water contacts and enters the mat, the solids content may decrease to 1.0% to 3.0%, and normally about 2.0%, and as the mat passes around the rolls, due to the tension in belts 2 and 6, the solids content may be increased to 2.0% to 6.0%, and generally about 4.0%. Thus, the solids content will alternately decrease and increase, as the mat moves in its path of travel through vessel 8. This intermittent squeezing action will act to effectively remove the dissolved solids, as well as inorganic fillers from the mat.

The wash water being introduced into the vessel 8 through shower 13 can be water removed during the papermaking process, and the wash water discharged from vessel 8 through outlet 15 can be recycled back to the pulper, as makeup water.

The composite structure consisting of belts 2 and 6 and the interposed mat 3, exits from the top of the washing vessel, and the mat 3 is then separated from the belts. As shown in the drawing, the composite structure passes between vacuum box 16 and roll 17. Belt 2 passes upwardly around the roll 17, and vacuum box 16 serves to prevent the mat 3 from following the belt 2. Belt 2 then travels over rolls 18, 19 and 20, in returning to headbox 1.

Belt 6 carrying mat 3 then passes around roll 21 and a doctor blade 22 removes the mat from belt 6. The removed mat is deposited in a trough 23 and can be conveyed by an auger 24 where it may typically be conveyed to a screw press to thicken the pulp for further treatment. Belt 6 then passes around rolls 25, 26, 27, 28 and 29 in returning to roll 5.

As the mat passes over the rolls 9-12, it is subjected to alternate compression and relaxation, resulting in a pumping action in which water is introduced and discharged from both surfaces of the mat. This action effectively removes inorganic fillers, such as clay and calcium carbonate from the pulp, as well as dissolved solids with minimum loss of fiber.

Various modes of carrying out the invention are contemplated as being within the scope of the following claims particularly pointing out and distinctly claiming the subject matter which is regarded as the invention.

I claim:

1. A method of washing cellulosic pulp, comprising the steps of forming a mat of cellulosic pulp containing dissolved solids and having a weight of 3 to 100 lbs. of dry fiber per 1,000 sq. ft. on a first porous belt, applying a second porous belt to an exposed surface of said mat to provide a composite structure, moving the composite structure in a generally vertical path of travel through a washing zone containing a plurality of generally vertically disposed rolls and passing the composite structure over the rolls in a generally sinuous path of travel in which a first of said pair of belts is in direct contact with one roll and a second of said pair of belts is in direct contact with the next adjacent roll to thereby subject the mat to compression as the mat travels over a roll and relaxation as the mat travels between adjacent rolls, directing wash water against portions of the composite structure traveling between adjacent pairs of said rolls to impregnate water into the mat when the mat is subjected to relaxation, and removing water and dissolved solids from the mat as the composite structure travels over a roll and the mat is subjected to compression.

2. A method of washing recycled pulp containing dissolved solids and inorganic fillers, comprising the steps of forming a mat of recycled cellulosic pulp having a weight of 3 to 100 lbs. of dry fiber per 1,000 sq. ft. on a first porous belt, applying a second porous belt to the exposed surface of said mat to provide a composite structure, moving the composite structure in a generally vertical path of travel through a washing zone containing a plurality of vertically disposed rolls and passing the composite structure over the rolls in a generally sinuous path of travel in which a first of said pair of belts is in direct contact with one roll and the second of said pair of belts is in direct contact with the next adjacent roll to thereby subject the mat to compression as the mat travels over a roll and relaxation as the mat travels between adjacent rolls, directing wash water against portions of the composite structure traveling between adjacent pairs of said rolls to impregnate water into said mat, and removing water from the mat when the mat is subjected to compression to thereby remove dissolved solids and fillers from said mat, removing the mat from between said pair of belts, collecting the wash water from the bottom of said washing zone.

3. The method of claim 2, and including the step of maintaining the mat as it is applied between said belts with a solids content in the range of 0.3% to 2.0% by weight.

4. The method of claim 3, and including the step of removing water from the mat before the mat enters said washing zone to provide said mat with a solids content of 2.0% to 6.0% by weight.

5. the method of claim 2, wherein water removed from the mat when the mat is subjected to compression is cascaded downwardly and impregnated into the mat at a lower level.

* * * * *